United States Patent [19]
Ozcelik et al.

[11] Patent Number: 6,128,340
[45] Date of Patent: *Oct. 3, 2000

[54] DECODER SYSTEM WITH 2.53 FRAME DISPLAY BUFFER

[75] Inventors: Taner Ozcelik, Fremont; Shirish Gadre, San Jose, both of Calif.

[73] Assignees: Sony Corporation, Tokyo, Japan; Sony Electronics Inc., Park Ridge, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/818,824

[22] Filed: Mar. 14, 1997

[51] Int. Cl.$^7$ .................................................. H04N 7/32
[52] U.S. Cl. ..................... 375/240; 348/409; 348/416; 348/718
[58] Field of Search .................... 348/384, 390, 348/409–413, 415, 416, 423, 699, 718, 396; 382/232, 233, 236, 238; 375/240; H04N 7/130, 7/137, 7/32

[56] References Cited

U.S. PATENT DOCUMENTS

| | | | |
|---|---|---|---|
| 5,278,646 | 1/1994 | Civanlar et al. | 348/415 |
| 5,278,647 | 1/1994 | Hingorani et al. | 348/416 |
| 5,386,234 | 1/1995 | Veltman et al. | 348/409 |
| 5,457,481 | 10/1995 | Sohn et al. | 348/416 |
| 5,481,553 | 1/1996 | Suzuki et al. | 348/415 |
| 5,581,310 | 12/1996 | Vinekar et al. | 348/718 |
| 5,646,693 | 7/1997 | Cismas | 348/409 |
| 5,691,768 | 11/1997 | Civanlar et al. | 348/423 |
| 5,699,117 | 12/1997 | Uramoto et al. | 348/390 |
| 5,818,533 | 10/1998 | Auld et al. | 348/412 |
| 5,835,636 | 11/1998 | Auld | 382/233 |
| 5,892,522 | 4/1999 | Moutin | 348/396 |

FOREIGN PATENT DOCUMENTS

| | | | |
|---|---|---|---|
| 0618722 A1 | 10/1994 | European Pat. Off. | H04N 5/907 |
| 0729276 A2 | 8/1996 | European Pat. Off. | H04N 7/50 |
| 0793391 A1 | 9/1997 | European Pat. Off. | H04N 7/50 |
| 2316824 | 3/1998 | United Kingdom | H04N 5/907 |
| WO 96/14710 | 5/1996 | WIPO | H04N 7/00 |

*Primary Examiner*—Richard Lee
*Attorney, Agent, or Firm*—Wood, Herron & Evans, L.L.P.

[57] ABSTRACT

A decoder system is provided for decoding an input video signal. A buffer memory hold slices of reconstructed B-pictures for display. The decoder is controlled in accordance with an amount of available memory in the buffer (the amount of available memory in the buffer depends both on how much data has been decoded and also upon how much data has been displayed). In addition, a buffer memory input controller controls into which locations of the buffer memory the slices of the reconstructed B-pictures are stored. As a result, only 2.53 frames of buffer memory are required.

9 Claims, 5 Drawing Sheets

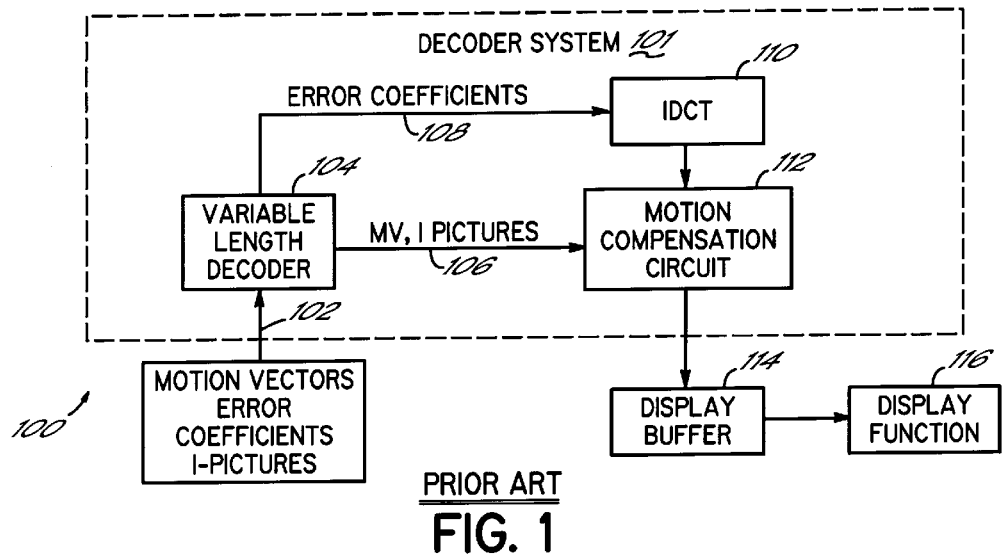
PRIOR ART
FIG. 1
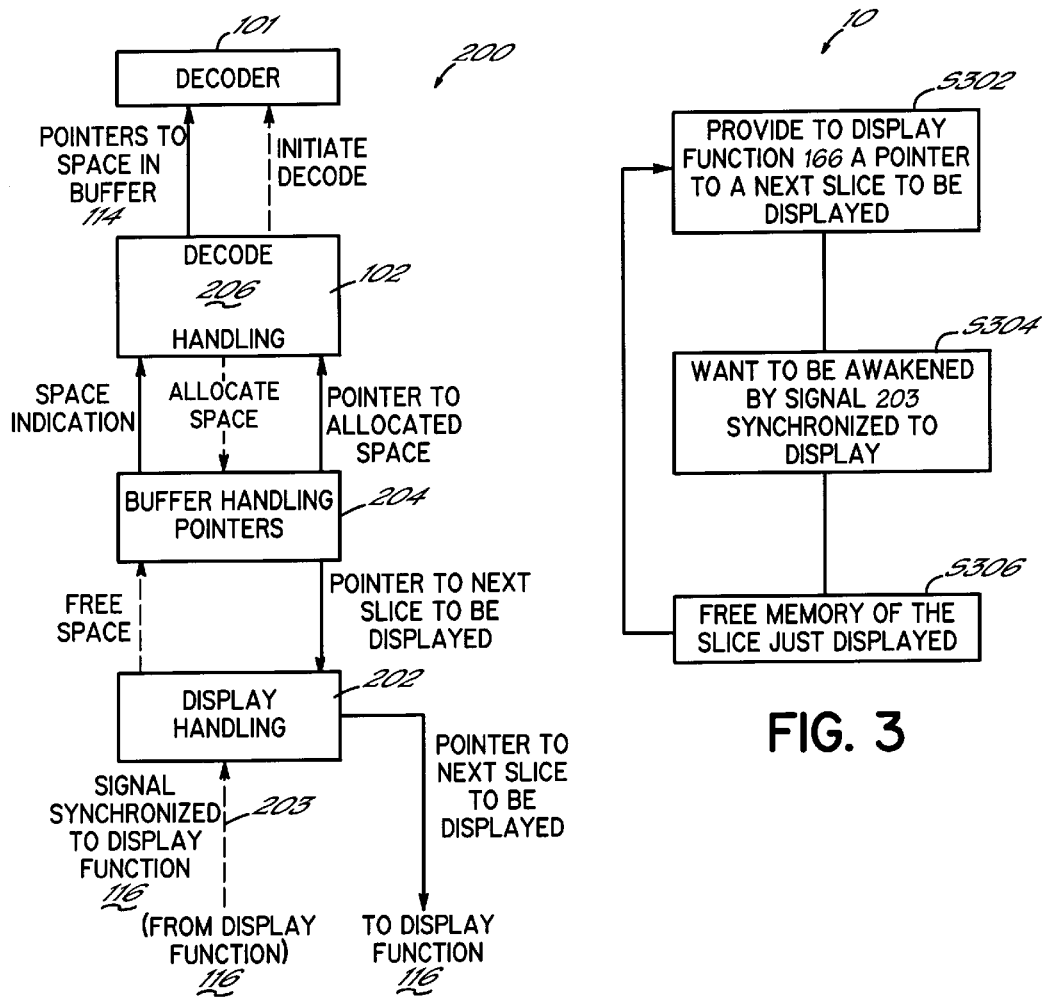
FIG. 2
FIG. 3

| T1 |
|---|
| B1 |
| T2 |
| B2 |
| T3 |
| B3 |
| T4 |
| B4 |
| T5 |
| B5 |
| T6 |

BEGINNING OF FIG.6

FIG.6A

| B6 |
|---|
| B1 |
| T2 |
| B2 |
| T3 |
| B3 |
| T4 |
| B4 |
| T5 |
| B5 |
| T6 |

FIG.6B

| B6 |
|---|
| B1 |
| T7 |
| B2 |
| T3 |
| B3 |
| T4 |
| B4 |
| T5 |
| B5 |
| T6 |

FIG.6C

| B6 |
|---|
| B1 |
| T7 |
| B2 |
| B7 |
| B3 |
| T4 |
| B4 |
| T5 |
| B5 |
| T6 |

FIG.6D

| B6 |
|---|
| B1 |
| T7 |
| B2 |
| B7 |
| B3 |
| T8 |
| B4 |
| T5 |
| B5 |
| T6 |

FIG.6E

| B6 |
|---|
| B1 |
| T7 |
| B2 |
| B7 |
| B3 |
| T8 |
| B4 |
| B8 |
| B5 |
| T6 |

FIG.6F

| B6 |
|---|
| B1 |
| T7 |
| B2 |
| B7 |
| B3 |
| T8 |
| B4 |
| B8 |
| B5 |
| T9 |

FIG.6G

| B6 |
|---|
| B1 |
| B9 |
| B2 |
| B7 |
| B3 |
| T10 |
| B4 |
| B8 |
| B5 |
| T9 |

FIG.6H

| B6 |
|---|
| B1 |
| B9 |
| B2 |
| B7 |
| B3 |
| T10 |
| B4 |
| B8 |
| B5 |
| B10 |

FIG.6I

| B6 |
|---|
| B1 |
| B9 |
| B2 |
| B7 |
| B3 |
|  |
| B4 |
| B8 |
| B5 |
| B10 |

END OF FIG.6

FIG.6J

DECODER SYSTEM WITH 2.53 FRAME DISPLAY BUFFER

TECHNICAL FIELD

The present invention relates to decoder systems for decoding MPEG-encoded video data for display and, in particular, to a decoder system that can decode MPEG-encoded video data for display employing only 2.53 frames of display buffer.

BACKGROUND

Advances in audio and video compression and decompression techniques, together with very large scale integration technology, have enabled the creation of new capabilities and markets. These include the storage of digital audio and video in computers and on small optical discs, as well as the transmission of digital audio and video signals from direct broadcast satellites.

Such advances were made possible, in part, by international standards which provide compatibility between different approaches to compression and decompression. One such standard is known as "JPEG," for Joint Photographic Expert Group. A later developed standard is known as "MPEG 1." This was the first set of standards agreed to by the Moving Pictures Expert Group. Yet another standard is known as "ITU-T H.261", which is a video compression standard particularly useful for video teleconferencing. Although each standard is designed for a specific application, all of the standards have much in common.

MPEG 1 was designed for storing and distributing audio and motion video, with emphasis on video quality. Its features include random access, fast forward and reverse playback. MPEG 1 serves as the basis for video CD's and for many video games. The original channel bandwidth and image resolution for MPEG 1 were established based upon the then available recording media available. The goal of MPEG 1 was the reproduction of recorded digital audio and video using a 12 centimeter diameter optical disc with a bit rate of 1.416 Mbps, 1.15 Mbps of which is allocated to video.

The compressed bit streams generated under the MPEG 1 standard implicitly define the decompression algorithms to be used for such bit streams. The compression algorithms, however, can vary within the specifications of the MPEG 1 standard, thereby allowing the possibility of a proprietary advantage in regard to the generation of compressed bit streams.

A later developed standard known as "MPEG 2" extends the basic concepts of MPEG 1 to cover a wider range of applications. Although the primary application of the MPEG 2 standards is the all digital transmission of broadcast-quality video at bit rates of 4 Mbps to 9 Mbps, it appears that the MPEG 2 standard may also be useful for other applications, such as the storage of full length motion pictures on 12 centimeter diameter optical discs, with resolution at least as good as that presently provided by 12 inch diameter optical discs.

The MPEG 2 standard relies upon three types of coded pictures. I ("intra") pictures are fields or frames coded as a stand-alone still image. Such I pictures allow random access points within a video stream. As such, I pictures should occur about two times per second. I pictures should also be used where scene cuts (such as in a motion picture) occur.

P ("predicted") pictures are fields or frames coded relative to the nearest previous I or P picture, resulting in forward prediction processing. P pictures allow more compression than I pictures, through the use of motion compensation, and also serve as a reference for B pictures and future P pictures.

B ("bidirectional") pictures are fields or frames that use the closest past and future I or P picture as a reference, resulting in bidirectional prediction. B pictures provide the most compression and increased signal to noise ratio by averaging two pictures. The theory behind I, P and B pictures are more thoroughly described in U.S. Pat. Nos. 5,386,234 and 5,481,553 assigned to Sony Corporation, which are incorporated herein by reference in their entirety.

A group of pictures ("GOP") is a series of one or more coded pictures which assist in random accessing and editing. A GOP value is configurable during the encoding process. Since the I pictures are closer together, the smaller the GOP value, the better the response to movement. The level of compression is, however, lower.

In a coded bitstream, a GOP must start with an I picture and may be followed by any number of I, P or B pictures in any order. In display order, a GOP must start with an I or B picture and end with an I or P picture. Thus, the smallest GOP size is a single I picture, with the largest size unlimited.

FIG. 1 is a block diagram illustrating a video decoder system 100, including a decoder 101. A coded bitstream 102 is input to a variable-length decoder (VLD) 104 of the decoder. The VLD 104 expands run/amplitude pairs of quantized frequency coefficients that are encoded into the bitstream 102. The frequency coefficients are then converted into the spatial domain using an inverse discrete cosine transform circuit 110. The resulting "error terms" indicate a content difference from a reference macroblock to another macroblock to be decoded (referred to herein as a "current macroblock").

Spatial differences from reference macroblocks to current macroblocks are encoded as two-dimensional motion vectors in the coded bitstream 102. Specifically, the two-dimensional motion vectors indicate movement from a reference macroblock to a current macroblock. In particular, a motion vector specifies where to retrieve a macroblock from a previously decoded frame (i.e., designates the "reference macroblock") to predict the pixel values of a current macroblock.

The error terms and the motion vectors are then provided to a motion compensation circuit 112. The motion compensation circuit 112 employs a reference macroblock and the error terms and motion vector for a current macroblock to predict the pixel values for the current macroblock. Once the pixel values for the current macroblock are determined, the current macroblock is stored into a display buffer memory 114. From the display buffer memory 114, the macroblocks are provided to a display circuit 116. The display circuit 116 may perform other display-related operations prior to actually displaying the decoded video. For example, the display circuit 116 may include circuitry for performing 420 to 422 conversion, letterbox conversion or other display-related operations.

Turning now specifically to the display function, the rate of consuming the macroblocks for display is regular. That is, the display operates synchronously to a display clock. However, as alluded to above, the order in which the pictures are encoded in the video bitstream 102 are not necessarily the order in which the pictures are to be displayed. Furthermore, MPEG 2 provides that the order in which the fields of a B picture are encoded are not necessarily the order in which the fields are to be displayed. In particular, a "top field" of a B picture frame may be provided before a "bottom field" of the same B picture frame, or vice versa. As a result, video decoder systems typically include a display buffer memory 114 that is large enough to hold three complete reconstructed and predicted pictures—an I picture, a P picture and a B picture.

However, memory for three complete pictures does not come without cost. Because modern video decoder systems are typically employed in portable apparatuses such as DVD players, it is expensive in terms of power and space to provide memory. Furthermore, it is desirable to free up display buffer memory so that other memory-intensive operations may utilize the freed-up memory.

SUMMARY

In accordance with the invention, a decoder system is provided for decoding an input video signal. A buffer memory hold slices of reconstructed B-pictures for display. The decoder is controlled in accordance with an amount of available memory in the buffer (the amount of available memory in the buffer depends both on how much data has been decoded and also upon how much data has been displayed). In addition, a buffer memory input controller controls into which locations of the buffer memory the slices of the reconstructed B-pictures are stored. As a result, only 2.53 frames of buffer memory are required.

BRIEF DESCRIPTION OF THE FIGURES

FIG. 1 illustrates a prior art decoding system.

FIG. 2 illustrates a decode synchronization circuit in accordance with an embodiment of the invention.

FIG. 3 is a flowchart that illustrates the processing of the display handling module of the FIG. 2 decode synchronization circuit.

FIGS. 6A through 6J illustrate an example of the decode and display scheme illustrated in FIG. 5C.

DETAILED DESCRIPTION

Figure 4:
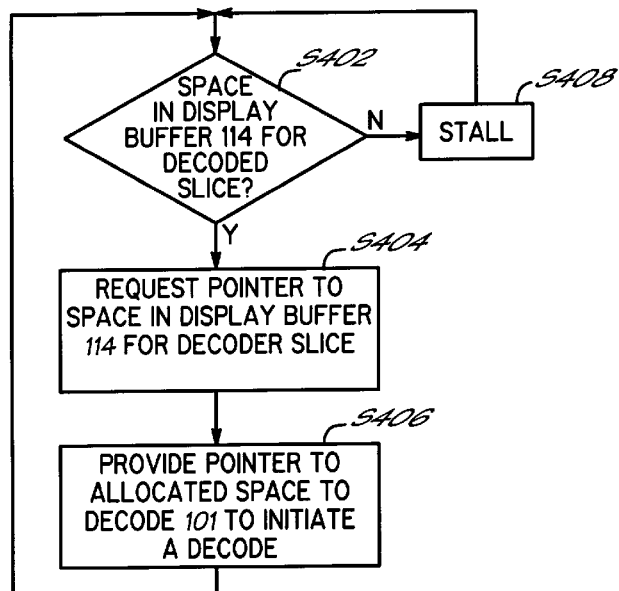
FIG. 4 is a flowchart that illustrates the processing of the decode handling module of the FIG. 2 decode synchronization circuit.

In accordance with a preferred embodiment of the invention, a decode synchronizer circuit 200 is provided, for use with a decoder system such as the prior art system 100, shown in FIG. 1. Broadly speaking, the decode synchronizer circuit 200 operates to synchronize the decoder 101 to the display function 116. In a preferred embodiment, the decode synchronizer circuit 200 consists of cooperating software modules being executed by a microprocessor.

The display handling module 202 of the decode synchronizer circuit 200 is now discussed with reference to the flow chart in FIG. 3. Since the display of I and P pictures may be entirely conventional, the focus of the following discussion is on displaying B pictures. Referring now to FIG. 3, at label S302 of the flowchart, the display handling module 202 provides to display function 116 a pointer to a next slice of a B picture in the display buffer 114 to be displayed. Then, at step S304, the display handling function 202 waits to be awakened by a signal 203 that is synchronized to the display function 116. Then, when the signal 203 is received, the display handling function 202 wakes up and executes step S306. At step 306, the display handling function 202 makes a "free space" request to free the memory in the display buffer 114 of the slice just displayed.

In response to the "free space" request from the display handling function 202, a buffer pointer handling function 204 returns to the display handling function 202 a pointer to a next slice to be displayed. Then, at step S302, the display handling function 202 provides to display function 116 the pointer which the display handling function 202 just received from the buffer pointer handling function 204 to the next slice to be displayed.

Meanwhile, a decode handling function 206 is being executed by the processor in accordance with the flow chart shown in FIG. 4. At step S402, the decode handling function 206 determines, by querying the buffer pointer handling function 204, whether there is space in display buffer 114 for another decoded slice. If it is determined at step S402 that there is space in display buffer 114 for another decoded slice, then, at step S404, the decode handling function 206 requests a pointer to the space in display buffer 114 for decoded slices. Then, at step S406, the decode handling function 206 provides the pointer to the allocated space to decoder 101 to initiate a decode. Alternately, if it is determined at step S402 that there is no space for decoded slices, then the decode handling function 206, at step S408, stalls. After stalling, execution continues at step S402.

Figure 5A:
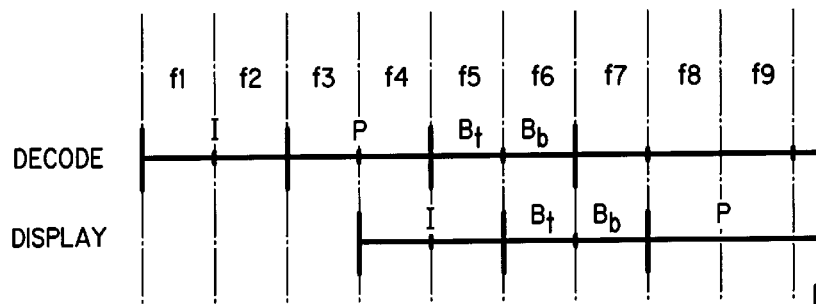
FIGS. 5A through 5C illustrate three different B picture decode and display schemes.
Figure 5B:
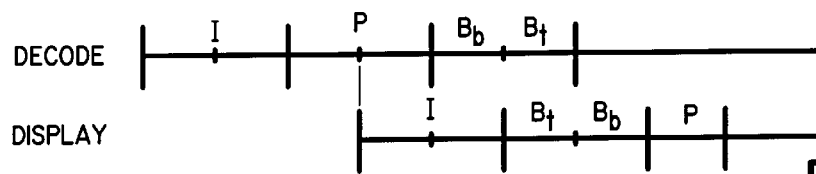
Figure 5C:
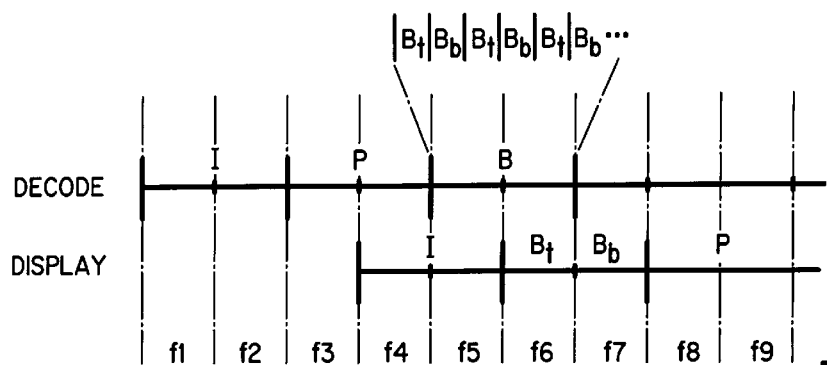
Figure 7:
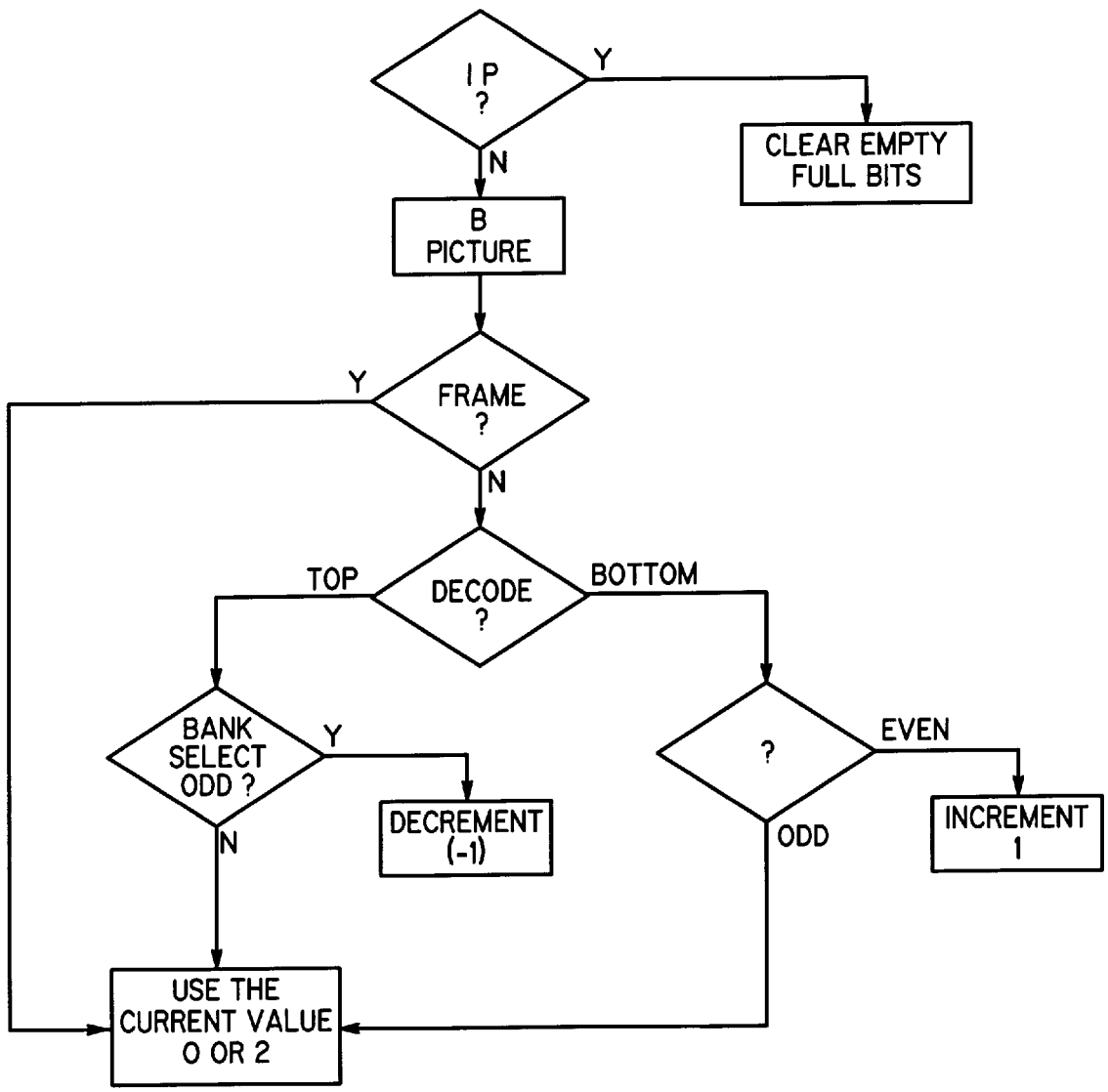
FIG. 7 shows a procedure in the "parse_upper_layer_RES" routine in Appendix A, that is executed once per field.
Figure 8:
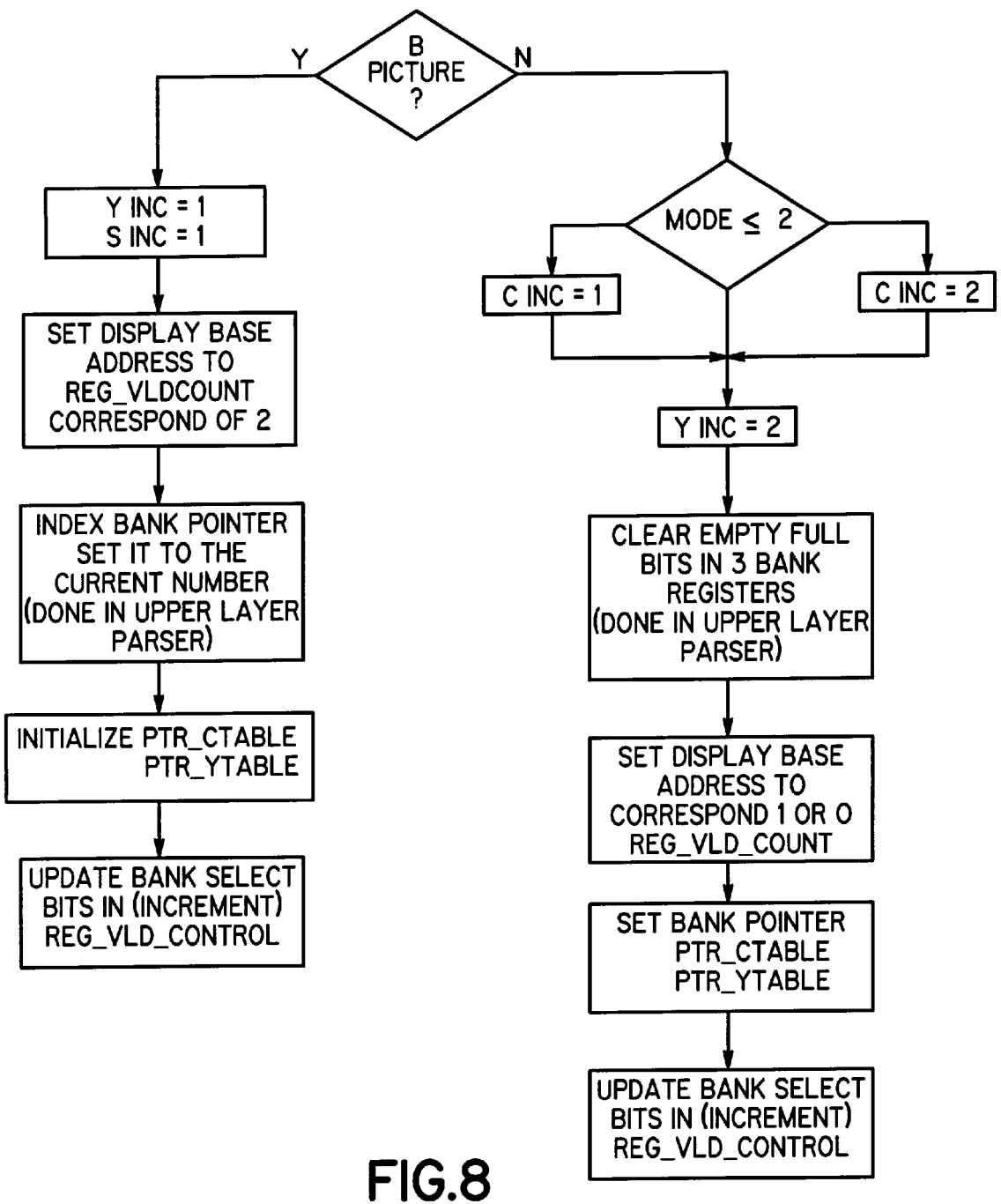
FIG. 8 shows a procedure in the "vid_field_init" routine in Appendix A, that is executed once per field.

An example of how buffer pointer handling function 204 operates is now described with reference to FIGS. 5A through 5C. As discussed in the Background, in MPEG 2, it is permissible for the order of I, P or B pictures in a coded bit-stream to be different from the order in which the pictures are to be displayed. FIGS. 5A through 5C illustrate a situation where the bitstream is decoded in I picture, then P picture, then B picture order, while the decoded pictures are displayed in I picture, B picture, and P picture order.

In each instance, the display is offset in time from the decode by 3 field display times. That is, a field of an I picture decoded in field time period f1 is displayed in field time period f4. Furthermore, both I pictures and P pictures may need to be referenced to decode later pictures in a group of pictures. Thus, a complete picture area is required for each of a decoded I picture and P picture. By contrast, B pictures are not needed for further reference. That is, B pictures are "fleeting" data and need not be saved for further reference. The invention takes advantage of this characteristic of B pictures to minimize the amount of area in the display buffer 114 required to buffer these B pictures.

Turning now to FIG. 5A, this figure illustrates a situation where the B picture is decoded top field first, then bottom field. As, as shown in FIG. 5A, a top field of a B picture (shown as $B_t$ in FIG. 5A) need only be held in display buffer 114 for one field time period, until it is displayed in field time period f6. Meanwhile, in field time period f6, as the slices of $B_t$ are being consumed by the display function 116, the slices of bottom field ($B_b$) of the B picture can be stored into the areas of display buffer 114 that are being freed up by the consumed portions of $B_t$. Thus, in an ideal situation, only 2.5 picture area are required for display buffer 114. However, since the decoder 101 and the display function 116 cannot be perfectly synchronized, it is necessary to have a small amount of additional area in the display buffer 114 (i.e., in addition to the 2.5 pictures worth of area) to account for this "slop". In a preferred embodiment, this additional area is limited to 0.03 pictures, the amount of area required to hold one slice of decoded picture.

Referring now to FIG. 5B, this figure shows a situation where the bottom field ($B_b$) of the B picture is decoded before the top field ($B_t$) of the B picture. However, the fields of the B picture must be displayed in reverse, that is, the top field of the B picture must be displayed before the bottom field of the B picture. Thus, as shown in FIG. 5B, the bottom field, after being decoded, is buffered for display. By contrast, the top field is displayed as it is being decoded. Thus, only a small portion (in the preferred embodiment, one slice) of the top field need be buffered in the display buffer 114.

FIG. 5C illustrates a situation where B pictures are decoded in frame format, rather than field format. That is, the slices of the top field and the slices of the bottom field are decoded by the decoder 101 in an interleaving fashion. Thus, referring specifically to FIG. 5C, in field period f5, slices of both top fields and bottom fields must be buffered. Then, in frame period f6, top field slices are displayed by display function 116. Meanwhile, the decoder 101 continues to decode top fields and bottom fields in the interleaving fashion. At this point, (i.e., in frame period f6), as new top field and bottom field slices are decoded, they are stored into portions of the display buffer 114 that are freed up as slices of the top fields are displayed. Then, by the time frame period F7 is reached, all of the slices of the bottom field have been decoded and stored into display buffer 114. These bottom field slices are then displayed by display function 116 during frame period F7.

FIG. 6A through 6J illustrate a simplistic example of how a B picture, whose top and bottom fields each have ten slices, is stored into display buffer 114 during frame periods f5 and f6. FIG. 6A illustrates the state of the portion of display buffer 114 used for buffering B picture data, at the beginning of frame period f6. In particular, FIG. 6A shows that display buffer 114 includes slices T1 through T6 of the top fields and slices B1 though B5 of the bottom field.

In FIG. 6B, slice T1 has been displayed and the portion of display buffer 114, freed up by the display of slice T1, is now occupied by slice B6.

In FIG. 6C, slice T2 has been displayed and the space in display buffer 114 previously occupied by now-displayed slice T2 is now occupied by decoded slice T7.

In FIG. 6D, slice T3 has been displayed and the portion of display buffer 114 previously occupied by now-displayed slice T3 is now occupied by decoded slice B7. This continues from FIG. 6E through 6I until, at FIG. 6J, slice T10 has been displayed and the portion of display buffer 114 for holding decoded B picture data now holds slices B1 through B10 of the bottom field of the just decoded B picture.

In accordance with a preferred embodiment, the granularity of the buffer 114 is 44 (rather than 11 as set forth in the simplistic example), where each buffer piece (1/44) contains 8 display lines.

What is claimed is:

1. A decoder system for decoding an input video signal, comprising a decoder circuit that reconstructs I-pictures from encoded I-picture data in the input video signal and, from the I-pictures and data including motion vectors in the input video signal other than the encoded I-picture data, generates P-pictures and B-pictures, a buffer memory that includes a plurality of independently addressable locations into which slices of the I-pictures, P-pictures and B-pictures are stored, and a control circuit for outputting slices from said buffer memory for display, vacating the locations at which the output slices had been stored, controlling a rate of decoding by the decoder circuit responsive to an amount of vacated slices in said buffer memory, and controlling into which slices of the buffer memory the slices of the reconstructed B-pictures are stored, wherein, when first and second fields of a B-picture are provided from the decoder circuit in an order which is opposite of an order in which said first and second fields are to be output for display, said control circuit causes slices of said first field to be stored into locations of said buffer memory, causes slices of said second field to be initially stored into locations of said buffer memory other than those locations occupied by slices of said first field, and as slices of said second field are output from said buffer memory, causes remaining slices of said second field to be stored on the fly into locations in said buffer memory vacated by slices of said second field that have been output, such that, after said second field has been output from said buffer memory, said first field is stored and available for output from said buffer memory.

2. The decoder system of claim 1 wherein, when first and second fields of a B-picture are provided from the decoder circuit in a display order, said control circuit causes slices of said first field to be stored into locations of said buffer memory, and after slices of said first field have been output from said buffer memory, causes slices of said second field to be stored into locations of said buffer memory vacated by slices of said first field that have been output.

3. The decoder system of claim 1 wherein, when first and second fields of a B-picture are provided from the decoder circuit in a frame format, said control circuit causes some slices of said first and second fields to be stored in locations of said buffer memory never occupied by slices of said B-picture, and causes other slices of said first and second fields to be stored into locations of said buffer memory vacated by slices of said B-picture that have been output.

4. A digital video memory control circuit for controlling a buffer memory that includes a plurality of independently addressable locations into which slices of reconstructed I-pictures, P-pictures and B-pictures are stored, said control circuit outputting slices of reconstructed pictures from said buffer memory for display, vacating the locations at which the output slices had been stored, receiving slices of reconstructed pictures from a decoder circuit, and controlling into which slices of the buffer memory slices of the reconstructed B-pictures are stored, wherein, when first and second fields of a B-picture are provided from the decoder circuit in an order which is opposite of an order in which said first and second fields are to be output for display, said control circuit causes slices of said first field to be stored into locations of said buffer memory, causes slices of said second field to be initially stored into locations of said buffer memory other than those locations occupied by slices of said first field, and as slices of said second field are output from said buffer memory, causes remaining slices of said second field to be stored on the fly into locations in said buffer memory vacated by slices of said second field that have been output, such that, after said second field has been output from said buffer memory, said first field is stored and available for output from said buffer memory.

5. The control circuit of claim 4 wherein, when first and second fields of a B-picture are provided from the decoder circuit in a display order, said control circuit causes slices of said first field to be stored into locations of said buffer memory, and after slices of said first field have been output from said buffer memory, causes slices of said second field to be stored into locations of said buffer memory vacated by slices of said first field that have been output.

6. The control circuit of claim 4 wherein, when first and second fields of a B-picture are provided from the decoder circuit in a frame format, said control circuit causes some slices of said first and second fields to be stored in locations of said buffer memory never occupied by slices of said B-picture, and causes other slices of said first and second fields to be stored into locations of said buffer memory vacated by slices of said B-picture that have been output.

7. A method of controlling a buffer memory that includes a plurality of independently addressable locations into which slices of reconstructed I-pictures, P-pictures and B-pictures are stored, by outputting slices of reconstructed pictures from said buffer memory for display, vacating the locations at which the output slices had been stored, receiving slices of reconstructed pictures from a decoder circuit, and controlling into which slices of the buffer memory slices of the reconstructed B-pictures are stored, wherein, when first and second fields of a B-picture are provided from the decoder circuit in an order which is opposite of an order in which said first and second fields are to be output for display, said method comprises causing slices of said first field to be stored into locations of said buffer memory, causing slices of said second field to be initially stored into locations of said buffer memory other than those locations occupied by slices of said first field, and as slices of said second field are output from said buffer memory, causing remaining slices of said second field to be stored on the fly into locations in said buffer memory vacated by slices of said second field that have been output, such that, after said second field has been output from said buffer memory, said first field is stored and available for output from said buffer memory.

8. The method of claim 7 wherein, when first and second fields of a B-picture are provided from the decoder circuit in a display order, said method comprises causing slices of said first field to be stored into locations of said buffer memory, and after slices of said first field have been output from said buffer memory, causing slices of said second field to be stored into locations of said buffer memory vacated by slices of said first field that have been output.

9. The method of claim 7 wherein, when first and second fields of a B-picture are provided from the decoder circuit in a frame format, said method comprises causing some slices of said first and second fields to be stored in locations of said buffer memory never occupied by slices of said B-picture, and causing other slices of said first and second fields to be stored into locations of said buffer memory vacated by slices of said B-picture that have been output.

* * * * *